United States Patent
Lochmann et al.

(10) Patent No.: US 12,513,229 B2
(45) Date of Patent: Dec. 30, 2025

(54) BUILDING TECHNOLOGY DEVICE

(71) Applicant: Tridonic GmbH & Co KG, Dornbirn (AT)

(72) Inventors: Frank Lochmann, Achberg (DE); Lukas Simma, Hohenweiler (AT)

(73) Assignee: Tridonic GmbH & Co KG, Dornbirn (AT)

( * ) Notice: Subject to any disclaimer, the term of this patent is extended or adjusted under 35 U.S.C. 154(b) by 156 days.

(21) Appl. No.: 17/909,800

(22) PCT Filed: Feb. 22, 2021

(86) PCT No.: PCT/EP2021/054348
§ 371 (c)(1),
(2) Date: Sep. 7, 2022

(87) PCT Pub. No.: WO2021/180455
PCT Pub. Date: Sep. 16, 2021

(65) Prior Publication Data
US 2024/0214476 A1 Jun. 27, 2024

(30) Foreign Application Priority Data
Mar. 11, 2020 (EP) ..................................... 20162479

(51) Int. Cl.
*H05B 45/60* (2022.01)
*H04L 69/18* (2022.01)
(Continued)

(52) U.S. Cl.
CPC ............. *H04L 69/18* (2013.01); *H05B 45/30* (2020.01); *H05B 47/183* (2024.01); *H05B 47/19* (2020.01); *H05B 47/1965* (2024.01)

(58) Field of Classification Search
CPC ....... F21V 33/00; G06B 11/01; G06B 19/042; G06F 1/32; G06F 9/46; H05B 47/19; H05B 45/30; H05B 47/1965; H05B 47/183
See application file for complete search history.

(56) References Cited

U.S. PATENT DOCUMENTS

| | | | | |
|---|---|---|---|---|
| RE49,872 E | * | 3/2024 | Tikkanen | ............... H05B 47/18 |
| 2008/0018261 A1 | * | 1/2008 | Kastner | ................. H05B 45/10 315/192 |

(Continued)

OTHER PUBLICATIONS

EP 20162479, European Search Report dated Sep. 8, 2020, 6 pages.
PCT/EP2021/054348, International Search Report and Written Opinion dated May 6, 2021, 5 pages.

*Primary Examiner* — Nicholas R Taylor
*Assistant Examiner* — Ho T Shiu
(74) *Attorney, Agent, or Firm* — .Andrus Intellectual Property Law, LLP

(57) ABSTRACT

The invention relates to a building technology device (100), for example an LED driver (200), comprising: a first control unit (101) and a second control unit (103), wherein the first control unit (101) is configured to execute a software, and wherein the second control unit (103) is configured to execute a further software, in particular an embedded software of the building technology device (100); an interface unit (105) arranged between the first control unit (101) and the second control unit (103); wherein the interface unit (105) comprises at least one external interface (107, 113) which is connectable to an external device (301); and wherein the at least one external interface (107, 113) is adapted to facilitate a selective communication between the external device (301) and the first control unit (101) and independently between the external device (301) and the second control unit (103).

11 Claims, 5 Drawing Sheets

(51) Int. Cl.
    *H05B 45/30*     (2020.01)
    *H05B 47/18*     (2020.01)
    *H05B 47/19*     (2020.01)
    *H05B 47/175*     (2020.01)

(56) References Cited

U.S. PATENT DOCUMENTS

| | | | |
|---|---|---|---|
| 2016/0286628 A1 | 9/2016 | Cho et al. | |
| 2016/0360594 A1* | 12/2016 | Chemel | H05B 47/105 |
| 2017/0223807 A1* | 8/2017 | Recker | H02J 7/34 |
| 2017/0279300 A1* | 9/2017 | Catalano | H02J 7/0068 |
| 2018/0195749 A1* | 7/2018 | Sinha | F24F 11/30 |

* cited by examiner

BUILDING TECHNOLOGY DEVICE

CROSS REFERENCE TO RELATED APPLICATIONS

The present application is the U.S. national stage application of international application PCT/EP2021/054348 filed Feb. 22, 2021, which international application was published on Sep. 16, 2021 as International Publication WO 2021/180455 A1. The international application claims priority to European Patent Application No. 20162479.8 filed Mar. 11, 2020.

TECHNICAL FIELD OF THE INVENTION

The invention relates to a building technology device, such as an LED driver, and a system comprising such a device.

BACKGROUND OF THE INVENTION

Many buildings are equipped with various building technology devices, such as LED luminaires, drivers, sensors or control units. These devices can be connected to a common supply line, e.g. a DALI bus, or a communication network within the building.

LED drivers are an example for such building technology devices. They can be used to provide a power supply to an LED load, e.g. LED luminaires in the building. Such LED drivers often comprise a converter, e.g. a primary side switched converter, and a control unit, such as an ASIC, for controlling the converter. Thereby, the converter typically executes software.

However, it is difficult to implement new software for a building technology device. Often the implementation of new software, e.g. software for controlling a wireless interface of the device, requires an adaption of an already installed embedded software. The new software and the embedded software may, for instance, use different communication protocols, which makes a cooperation of these software products difficult.

Thus, it is an objective of the invention to provide an improved building technology device and an improved system comprising such a device, which avoids the above-mentioned disadvantages. In particular, it is an objective of the invention to provide a building technology device that allows for an easier implementation and/or use of different software in parallel. The object of the present invention is achieved by the solution provided in the enclosed independent claims. Advantageous implementations of the present invention are further defined in the dependent claims.

SUMMARY OF THE INVENTION

According to a first aspect, the invention relates to a building technology device, for example an LED driver, comprising: a first control unit and a second control unit, wherein the first control unit is configured to execute a software, and wherein the second control unit is configured to execute a further software, in particular an embedded software of the building technology device; an interface unit arranged between the first control unit and the second control unit; wherein the interface unit comprises at least one external interface which is connectable to an external device; and wherein the at least one external interface is adapted to facilitate a selective communication between the external device and the first control unit and independently between the external device and the second control unit.

This achieves the advantage that a communication between the external device and any one of the two software, e.g. for debugging, can be done independently of the respective other software.

The software which is executed by the first control unit can be new software for building technology device, in particular new software that needs to be adapted to the device. For example, this software is configured for controlling a communication interface of the device.

The software can also be a test software that can be tested by the first control unit, either together with or separately from the embedded software of the driver.

The external device can be configured to perform a debugging of the software, in particular independently of the further software.

The further software can be a system-related software of the building technology device. In particular, the further software controls key components of the device, such as a converter.

The software and the further software can use two different communication protocols, which can make a direct communication and cooperation between both these software products difficult.

Each of the first and/or second control unit can be a microcontroller or an ASIC.

In an embodiment, the interface unit is configured to transmit data between the first control unit and the external device without forwarding said data to the second control unit, and/or to transmit data between the second control unit and the external device without forwarding said data to the first control unit.

This achieves the advantage that a communication between the external device and any one of the two software, e.g. for debugging, can be done independently of the respective other software.

In an embodiment, the interface unit comprises a first and a second external interface, wherein the first external interface is configured to receive data from the first control unit and forward said data to the external device, and wherein the second external interface is configured to receive modified data from the external device and to forward said modified data to the second control unit.

This achieves the advantage, that the external device can influence and/or control a communication between the control units.

For instance, the software and the further software may use different communication protocols. The external device can be configured to translate the data received from the first control unit to the communication protocol used by the further software.

Preferably, the external device can facilitate a communication and/or cooperation between the software and the further software, without requiring an adaption of any of these two software products.

Preferably, it is also possible to manipulating the signals exchanged between the first and the second control unit by means of the external device, e.g. for causing or simulating a certain behavior of the building technology device. In particular, by modifying the exchanged signals, a certain behavior of the device can be induced for test purposes. The external device can thereby act as a "man-in-the-middle" device.

Alternatively, the second external interface can be configured to receive data from the second control unit and forward said data to the external device, and the first external interface can be configured to receive modified data from the external device and to forward said modified data to the first control unit.

The external device can also be configured to just forward the data received via the first external interface to the second control unit or vice versa, i.e. the data and the manipulated data can be essentially identical. In this way, the external device can monitor a communication between both control units and intervene if necessary.

In an embodiment, the interface unit is adapted to connect or disconnect the first control unit from the second control unit.

This achieves the advantage that both control units can operate together or independently from another, e.g. depending on a current use of the building technology device.

In an embodiment, the interface unit is configured to disconnect the first from the second control unit if the external device is communicating with the first and/or the second control unit.

This achieves the advantage that data exchanged between the external device and one of the control units is not shared with the other control unit.

In an embodiment, if the first and the second control unit are connected by the interface unit, the at least one external interface is configured to forward signals that are exchanged between the first and the second control unit to the external device for monitoring a communication between the control units.

This achieves the advantage that the external device can monitor a communication between both control units.

If both control units are connected, they can exchange data for a common control of the building technology device.

In an embodiment, the interface unit comprises at least one connection line arranged between the first control unit and the second control unit.

In an embodiment, the interface unit comprises a first switching unit and a second switching unit, wherein the first switching unit is arranged between first control unit and the at least one external interface and wherein the second switching unit is arranged between the at least one external interface and the second control unit.

This achieves the advantage that the control units can be efficiently connected or disconnected from each other and from the at least one external interface.

The first and/or second switching unit can comprise a switch on each connection line.

In an embodiment, the interface unit comprises a third switching unit, which is arranged in-between two external interfaces of the interface unit.

This achieves the advantage that both control units can be disconnected from each other, while still being connected to the external device. In this configuration, data can only be exchanged between the control units via the external device, which may monitor or manipulate said data.

In an embodiment, the building technology device further comprises a communication interface, in particular a wireless interface, which is connected to the first control unit.

For instance, the software is configured to interpret a wireless protocol of signals received at the wireless interface and translate said signals to another protocol, such as DALI. The software can further be configured to control the wireless interface when executed on the first control unit.

According to a second aspect, the invention relates to a system comprising the external device and the building technology device according to the first aspect of the invention.

This achieves the advantage that a communication between external device and any of the two software, e.g. for debugging, can be done independently of the other software.

BRIEF DESCRIPTION OF THE DRAWINGS

The invention will be explained in the followings together with the figures.

DETAILED DESCRIPTION OF THE PREFERRED EMBODIMENTS

Figure 1B:
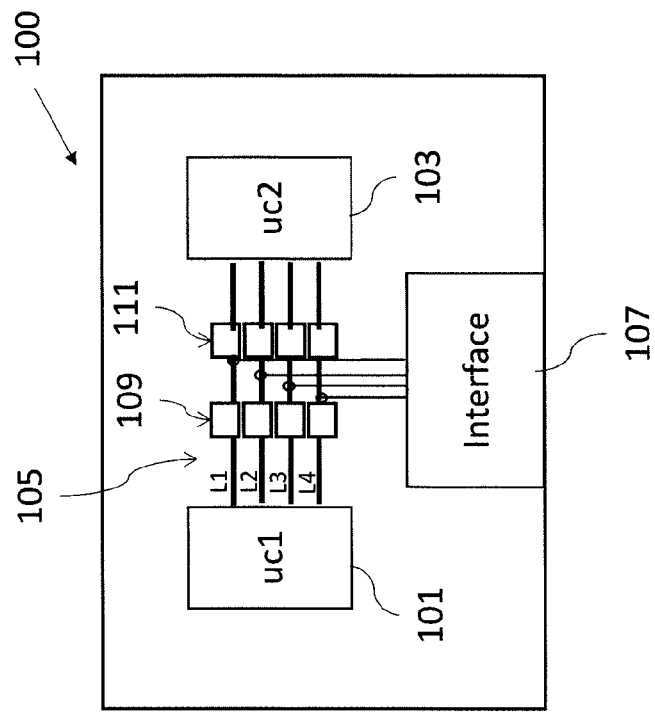
FIG. 1a-c shows schematic diagrams of building technology devices according to embodiments.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 1A:
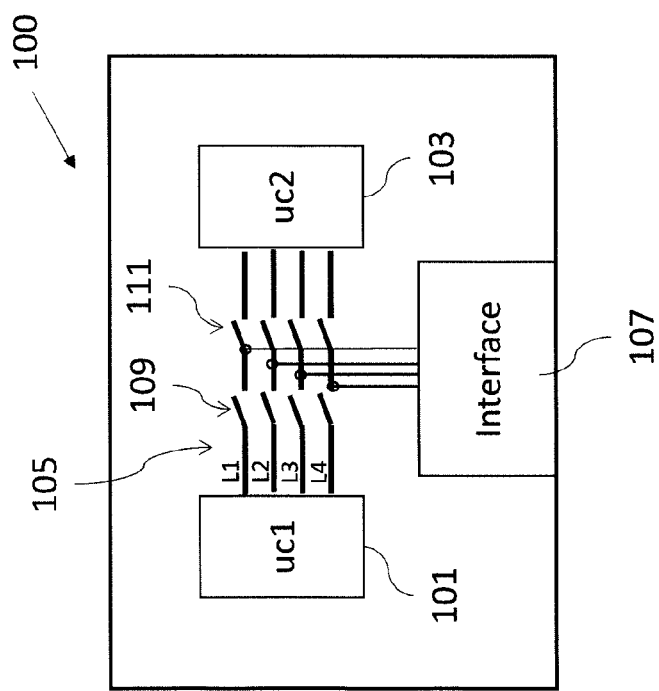

FIG. 1a shows a schematic diagram of a building technology device 100 according to an embodiment.

The building technology device 100 comprises a first control unit 101 and a second control unit 103, wherein the first control unit 101 is configured to execute a software, and wherein the second control unit 103 is configured to execute a further software, in particular an embedded software of the building technology device 100. The building technology device 100 further comprises an interface unit 105 arranged between the first control unit 101 and the second control unit 103. The interface unit 105 comprises at least one external interface 107 which is connectable to an external device (not shown), wherein the at least one external interface 107 is adapted to facilitate a selective communication between the external device and the first control unit and between the external device and the second control unit, respectively. In particular, the communication between the external device and the first control unit 101 is independent from the communication between the external device and the second control unit 103.

The building technology device 100 can be a lighting technology device, e.g. an LED driver, and LED luminaire, a sensor or a control unit. The building technology device 100 can be connected to a communication and/or supply network, e.g. a DALI bus or a wireless network.

The software executed by the first control unit 101 can be new software for the device 100, in particular new software that needs to be adapted to the device 100. For example, this software is configured for controlling a communication interface of the device 100.

The further software can be a system-related software of the building technology device 100. In particular, the further software controls key components of the device 100, such as a converter.

The software and the further software can use two different communication protocols, which can make a direct cooperation and communicate between both software products difficult.

Each of the first and/or second control unit 101, 103 can be a microcontroller or an ASIC.

The interface unit 105 can be configured to transmit data between the first control unit 101 and the external device 301 without forwarding said data to the second control unit 103, and/or to transmit data between the second control unit 103 and the external device 301 without forwarding said data to the first control unit 101.

For example, the external device is adapted to perform a debugging of the software or the further software.

The interface unit 105 may comprises a number of connection lines L1-L4 arranged between the first control unit 101 and the second control unit 103, for exchanging signals between both control units 101, 103.

In FIG. 1*a*, the interface unit comprises four connection lines L1-L4, which are, for instance, electrical lines for exchanging signals between the two control units 101, 103.

In particular, the at least one external interface 107 can be connected to a connection point on each of the connection lines L1-L4 between the first and the second control unit 101, 103.

The external interface 107 can be a wireless interface or a wire bound interface. The external device can be a computing device, e.g. a laptop or a computer, connected to the at least one external interface 107.

Preferably, the interface unit 105 comprises a first switching unit 109 and a second switching unit 111. The first switching unit 109 may be arranged between the first control unit 101 and the at least one external interface 107, and the second switching unit 111 may be arranged between the at least one external interface 107 and the second control unit 103.

In particular, the first switching unit 109 and the second switching unit 111 comprise switches on each connection lines L1-L4 of the interface unit 105.

The interface unit 105 can be configured to connect or disconnect the first control unit 101 from the second control unit 103, in particular by means of the first and/or the second switching unit 109, 111.

In particular, the first switching unit 109 can be configured to disconnect both control units 101, 103 if the second control unit 103 is communicating with the external device, and the second switching unit 111 can be configured to disconnect both control units 101, 103 if the first control unit 101 is communicating with the external device. Thus, no data can is exchanged between the control units 101, 103 directly if one of them is communicating with the external device.

Preferably, if the first and the second control unit 101, 103 are connected by the interface unit 105, the at least one external interface 107 is configured to forward the signals that are exchanged between the first and the second control unit 101, 103 to the external device. In this way, the external device can monitor a communication between the control units 101, 103.

If both control units 101, 103 are connected, they can exchange signals for a common control of the building technology device 100. These signals can be forwarded to the external device via the external interface 107. For instance, both control units 101, 103 are configured to communicate by means of the DALI protocol.

The first and the second switching unit 109, 111 can comprise switches on each line L1-L4 that physically interrupt the respective line L1-L4.

FIG. 1*b* shows a schematic diagram of the building technology device 100 according to another embodiment.

In the exemplary embodiment of the LED driver 100 shown in FIG. 1*b*, the switches are no longer depicted as physical switches.

For instance, the first and/or second switching unit 109, 111 can comprise switchable devices, in particular a MOSFETs. The switching devices can be controlled by a control signal, e.g. a gate voltage.

Figure 1C:
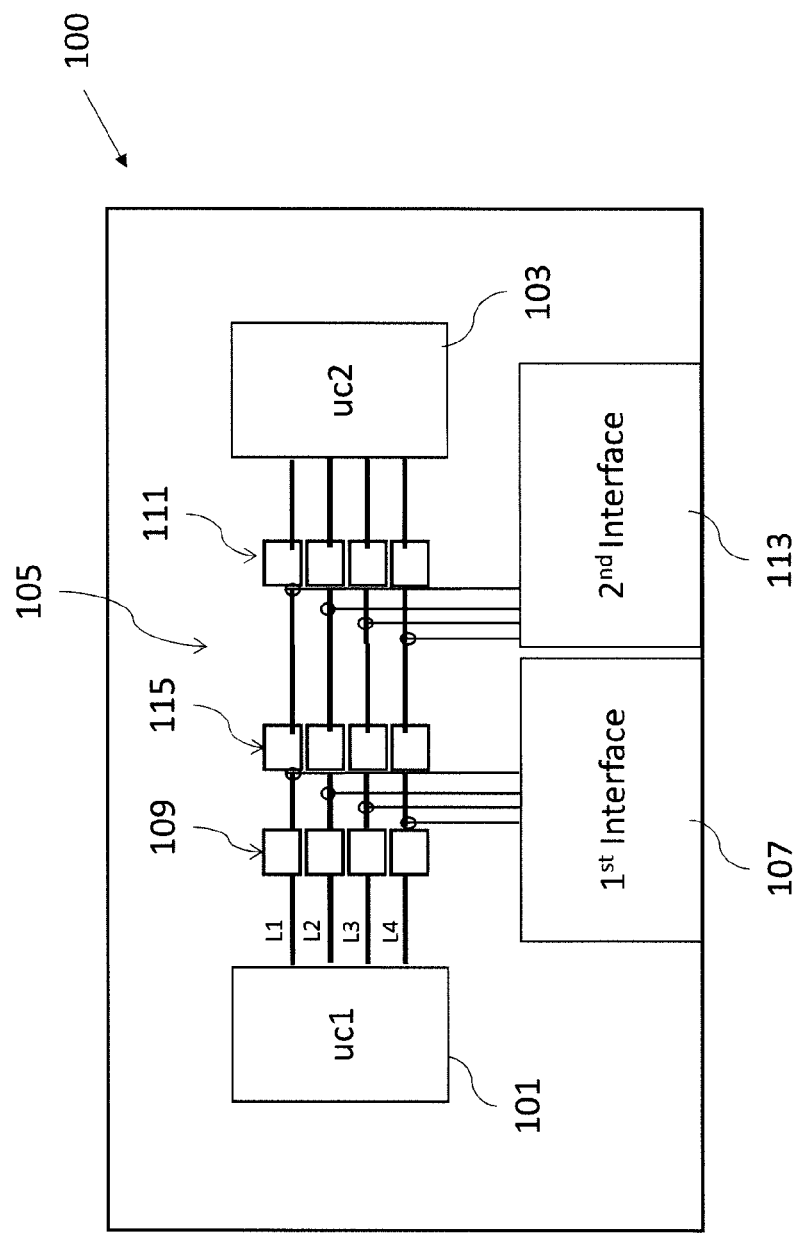

FIG. 1*c* shows a schematic diagram of the building technology device 100 according to another embodiment.

In the embodiment shown in FIG. 1*c*, the interface unit 105 comprises a first external interface 107 and a second external interface 113. Both external interfaces are connected to the at least one connection line L1-L4 between the control units 101, 103, in particular to a connection point on each line L1-L4. In particular, the first external interface 107 in FIG. 1*c* corresponds to the external interface 107 in FIGS. 1*a* and 1*b*.

The first external interface 107 can be configured to receive data from the first control unit 101 and forward said data to the external device 301. The second external interface 113 can be configured to receive modified data from the external device 30) and to forward said modified data to the second control unit 103.

In this way, it is possible to monitor and/or manipulate signals exchanged between the first and the second control unit 101, 103. For instance, by modifying the data, certain behavior of the building technology device 100 can be simulated or induced, e.g. for test purposes. The external device can thereby act as a "man-in-the-middle" device.

Preferably, the external device can facilitate a communication and/or cooperation between the software and the further software, without requiring an adaption of any of these two software products.

The interface unit 105 may comprise a third switching unit 115, which is arranged in-between two external interfaces 107, 113. The third switching unit 115 allows disconnecting the control units 101, 103 from each other, while the first control unit 101 and second control unit are connected to the external interfaces 107, 113. Thus, direct communication between the control units 101, 103 is prevented and signals can only be exchanged between the control units 101, 103 via the external device.

For example, if the first control unit 101 is disconnected from the second control unit 103 by the third switching unit 115, than the behavior of the software or the further software can be stimulated and/or monitored independently from another by the external device. In particular, separating first and second control units 101, 103 leads to a separation of responsibilities of both control units 101, 103.

In particular, first and the second control unit 101, 103 and, thus, the software and the embedded software, can be debugged independently from each other if the first control unit 101 is disconnected from the second control unit 103.

The first or the second external interface 107, 113 also be set to ground. For instance if the external device is only connected to one of the interfaces 107, 113, the respective other interface 107, 113 can be set to ground.

In particular, the third switching unit 115 comprise switches on each connection lines L1-L4 of the interface unit 105.

Figure 2:
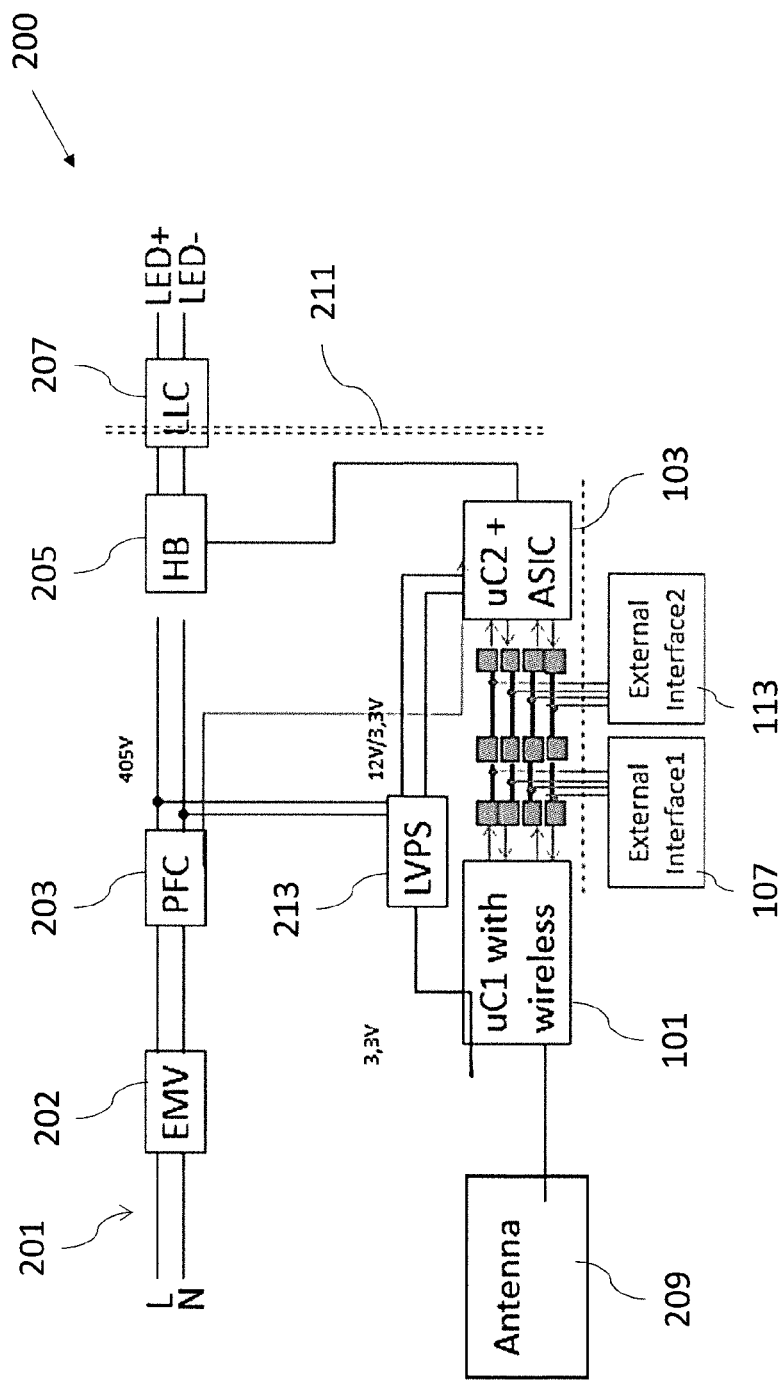
FIG. 2 shows a schematic diagram of an LED driver according to an embodiment.

FIG. 2 shows a schematic diagram of an LED driver 200 according to another embodiment. In particular, the LED driver 200 is an exemplary embodiment of a building technology device 100.

The LED driver 200, as shown in FIG. 2, comprises the first and the second control unit 101, 103 connected by the interface unit 105, wherein the interface unit 105 comprises the first external interface 107 and the second external interface 113.

The first interface unit 101 can be connected to a communication interface 209 of the driver 200. The communication interface 209 can be a Bluetooth interface, a DALI interface or a ZigBee interface.

In particular, the first interface unit 101 is connected to an antenna of the communication interface 209, e.g. a Bluetooth antenna.

The LED driver 200 can be connected to a supply line 201 that supplies the driver 200 with a supply voltage, e.g. a mains voltage. The supply line 201 can comprise a two-wire cable.

The LED driver 200 can comprise an electromagnetic interference (EMI) filter 202 that forwards the supply voltage to a PFC circuitry 203.

The LED driver 200 can further comprise a low voltage power supply 213, which can be configured to provide a voltage supply to the first and the second control unit 101, 103. The low voltage power supply can receive its power supply from the PFC circuitry 203.

In particular, the first and/or the second control unit 101, 103 is a microcontroller or an ASIC.

The LED driver 200 can comprise a half bride unit 205 connected to an LLC converter unit 207. The half bride unit 205 and the LLC converter unit 207 can form a converter, in particular a half bridge LLC converter, of the LED driver 200.

The PFC circuitry 203 can be configured to supply the converter with a bus voltage.

The LED driver 200 can further comprise a galvanic isolation stage 211 that separates a primary side of the half bride LLC converter from a secondary side. In particular, the LED load is connected to the secondary side.

Preferably, the first and the second control unit 101, 103 and the interface unit 105 are arranged on the primary side of the galvanic isolation stage 211.

Figure 3:
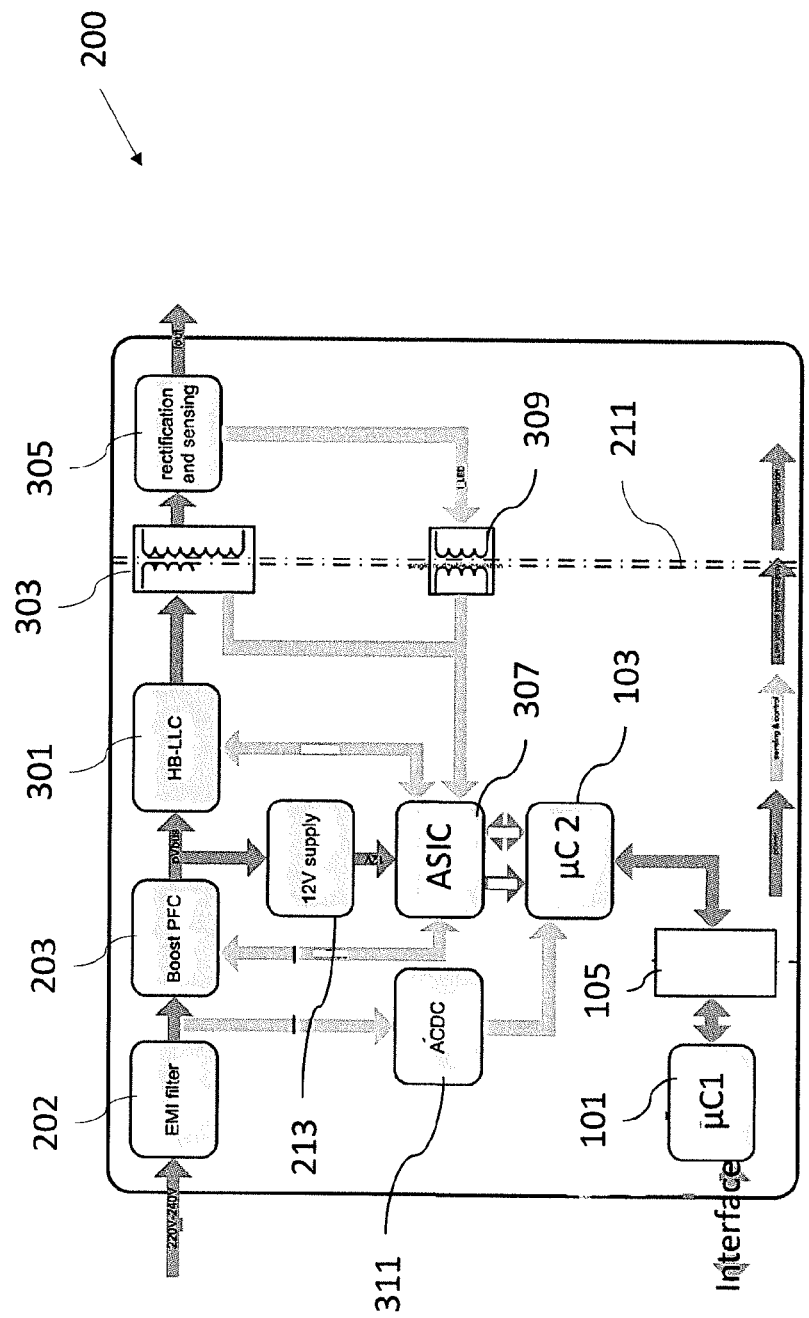
FIG. 3 shows a schematic diagram of an LED driver according to an embodiment.

FIG. 3 shows a schematic diagram of the LED driver 200 according to a further embodiment. In particular, the LED driver 200 is an exemplary embodiment of a building technology device 100.

The LED driver 200, as shown in FIG. 3, comprises the first and the second control unit 101, 103 connected by the interface unit 105.

The LED driver 200, in the exemplary embodiment of FIG. 3, further comprises the EMI filter 202 that forwards a supply voltage, e.g. a mains voltage, to the PFC circuitry 203, in particular a Boost PFC circuit. The PFC circuitry 203 can in turn supply a converter 301 with a bus voltage. The converter 301 can be a half bridge LLC converter.

The LED driver 200 can further comprise an ASIC 307 that can be separate from the first and the second control unit 101, 103. For instance, the ASIC 307 is configured to perform a feedback control of a secondary side voltage of the converter 301 and/or the PFC circuitry 203.

Preferably, the second control unit 103 is configured to control the ASIC based on the embedded software executed on the second control unit. If the first control unit 101 is connected to the second control unit 103 via the interface unit 105, the first and the second control unit 101, 103 can be configured to exchange signals for a common control of the ASIC 307.

The first control unit 101 can further be connected to a communication interface of the LED driver 200, e.g a DALI interface.

The LED driver 200 further comprise a low voltage power supply 213 which can be configured to supply the ASIC 307, the second control unit 103 and/or the first control unit 101 with a supply voltage.

The LED driver 200 can further comprise an AC/DC converter 311 which is arranged to supply at least the second control unit 103 with a DC voltage signal.

The LED driver can further comprise the galvanic isolation stage 211, which is arranged to separate a primary from a secondary side of the driver 200, in particular of the converter 301.

In an embodiment, the LED driver 200 comprises a rectification and sensing circuit 305, which is arranged on the secondary side of the galvanic isolation stage 211 and, thus, isolated from the other components of the LED driver 200.

The rectification and sensing circuit 305 can be configured to supply an LED load with an output voltage.

The LED driver 200 in FIG. 2 further comprises a first transformer 303, representing an LLC transformer of the converter 301, and a second transformer 309, e.g. representing an output current sensing transformer.

Figure 4:
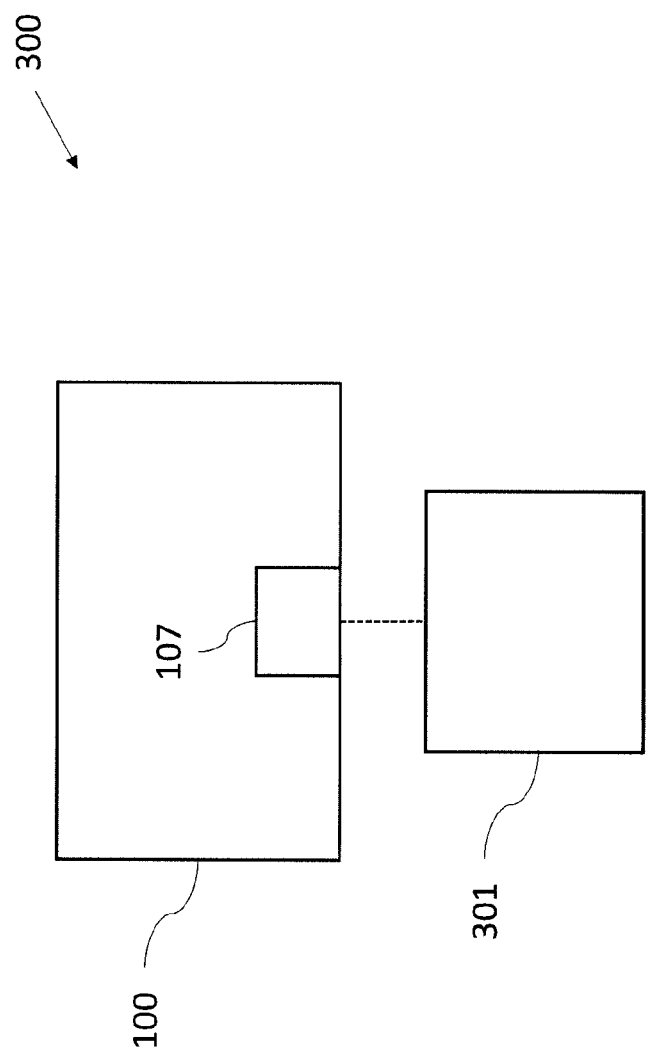
FIG. 4 shows a schematic diagram of a system comprising a building technology device according to an embodiment.

FIG. 4 shows a schematic diagram of a system 300 comprising the building technology device 100 according to an embodiment. The system 300 further comprises the external device 301.

The external device 301 can be connected to the at least one external interface 107 of the building technology device 100, e.g. by means of a wireless or a wire bound connection.

The external device 301 can be a data processing device, e.g. a laptop, a smartphone or a computer.

The external device 301 can be configured to communicate independently with the first control unit 101 or with the second control unit 103.

The external device 301 can be configured to receive data from the first control unit 101, modify said data, and forward the modified data to the second control unit 103, or vice versa. The external device 301 can further be configured to monitor signals that are exchanged between both control units 101, 103 of the building technology device 100.

The external device 301 can comprise a processor for modifying and/or monitoring data received from the building technology device 100.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only one of the several implementations, such features may be combined with one or more other features of the other implementations as may be desired and advantage for any given or particular application.

The invention claimed is:

1. A building technology device (100) in particular an LED driver (200) comprising:
a first control unit (101) and a second control unit (103) operating in parallel, wherein the first control unit (101) is configured to execute a software, and wherein the second control unit (103) is configured to execute a further software, in particular an embedded software of the building technology device (100);
at least one electrical connection line (L1-L4) arranged between the first control unit (101) and the second control unit (103);
an interface unit (105) arranged between the first control unit (101) and the second control unit (103) and comprising at least one external interface (107, 113) connected to the at least one electrical connection line (L1-L4) and also connectable to an external device (301), a first switching unit (109) and a second switching unit (111), the first switching unit (109) being arranged in the at least one electrical connection line (L1-L4) between first control unit (101) and the at least one external interface (107, 113), and the second switching unit (111) being arranged in the at least one electrical connection line (L1-L4) between the at least one external interface (107, 113) and the second control unit (103); and
wherein the at least one external interface (107, 113) is adapted to facilitate a selective communication between the external device (301) and the first control unit (101) and independently between the external device (301) and the second control unit (103);
wherein the LED driver (200) comprises a galvanic isolation stage that separates a primary side of a half bridge LLC from a secondary side to which an LED load is connected;
wherein the first and second control units are arranged on the primary side of the galvanic isolation stage;
wherein the LED driver (200) further comprises a low power voltage supply that provides voltage to the first and second control units.

2. The building technology device (100) according to claim 1, wherein the interface unit (105) is configured to transmit data between the first control unit (101) and the external device (301) without forwarding said data to the second control unit (103), and/or to transmit data between the second control unit (103) and the external device (301) without forwarding said data to the first control unit (101).

3. The building technology device (100) according to claim 1, wherein the interface unit (105) comprises a first and a second external interface (107, 113), wherein the first external interface (107) is configured to receive data from the first control unit (101) and forward said data to the external device (301), and wherein the second external interface (113) is configured to receive modified data from the external device (301) and to forward said modified data to the second control unit (103).

4. The building technology device (100) according to claim 1, wherein the interface unit (105) is adapted to connect or disconnect the first control unit (101) from the second control unit (103).

5. The building technology device (100) according to claim 4, wherein the interface unit (105) is configured to disconnect the first from the second control unit (101, 103) if the external device (301) is communicating with the first and/or the second control unit (101, 103).

6. The building technology device (100) according to claim 4, wherein if the first and the second control unit (101, 103) are connected by the interface unit (105), the at least one external interface (107) is configured to forward signals that are exchanged between the first and the second control unit (101, 103) to the external device for monitoring a communication between the control units (101, 103).

7. The building technology device (100) according to claim 1, wherein the interface unit (105) comprises said at least one electrical connection line (L1-L4) arranged between the first control unit (101) and the second control unit (103).

8. The building technology device (100) according to claim 1, wherein the interface unit (105) comprises a third switching unit (115), which is arranged in-between two external interfaces (107, 113) of the interface unit (105).

9. The building technology device (100) according to claim 1, wherein the building technology device (100) further comprises a communication interface (209), in particular a wireless interface, which is connected to the first control unit (101).

10. A system (300) comprising the external device (301) and the building technology device (100) according to claim 1.

11. The building technology device (100) of claim 1 wherein each of the first and second switching units comprise a plurality of MOSFETs.

* * * * *